US011227263B2

(12) United States Patent
Lagares-Greenblatt et al.

(10) Patent No.: US 11,227,263 B2
(45) Date of Patent: Jan. 18, 2022

(54) PROVIDING INSIGHTS ABOUT ATTENDEES OF SMART WEB-EVENTS

(71) Applicant: International Business Machines Corporation, Armonk, NY (US)

(72) Inventors: Heidi Lagares-Greenblatt, Jefferson Hills, PA (US); Jenny S. Li, Cary, NC (US); Xinlin Wang, Irvine, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 142 days.

(21) Appl. No.: 16/221,686

(22) Filed: Dec. 17, 2018

(65) Prior Publication Data

US 2020/0193389 A1 Jun. 18, 2020

(51) Int. Cl.
*G06Q 10/10* (2012.01)
*G06F 16/953* (2019.01)
*G06Q 10/06* (2012.01)

(52) U.S. Cl.
CPC ....... *G06Q 10/1095* (2013.01); *G06F 16/953* (2019.01); *G06Q 10/063114* (2013.01)

(58) Field of Classification Search
CPC combination set(s) only.
See application file for complete search history.

(56) References Cited

U.S. PATENT DOCUMENTS

| 2008/0281608 | A1* | 11/2008 | Vedula | G06Q 40/12 |
| | | | | 705/1.1 |
| 2011/0022967 | A1 | 1/2011 | Mjayakumar et al. | |
| 2013/0106985 | A1 | 5/2013 | Tandon et al. | |
| 2014/0372909 | A1* | 12/2014 | Buford | G06Q 50/01 |
| | | | | 715/753 |
| 2015/0271220 | A1* | 9/2015 | Kleiner | G06Q 10/101 |
| | | | | 709/204 |
| 2015/0379478 | A1* | 12/2015 | Klemm | G06F 16/60 |
| | | | | 705/7.19 |
| 2019/0239037 | A1* | 8/2019 | Hung | H04W 4/18 |

* cited by examiner

*Primary Examiner* — Arif Ullah
(74) *Attorney, Agent, or Firm* — Cantor Colburn LLP; Teddi Maranzano

(57) ABSTRACT

Aspects of the invention include retrieving, by a processor, a list of participants invited to a meeting, the list of participants including a first participant and a second participant. It is determined, by the processor, whether the first participant has previously interacted with the second participant. Output is provided, by the processor to a user interface of a user device. The output includes information about the second participant based at least in part on determining that the first participant has not previously interacted with the second participant. The output includes information about an interaction between the first participant and the second participant based at least in part on determining that the first participant has previously interacted with the second participant.

16 Claims, 9 Drawing Sheets

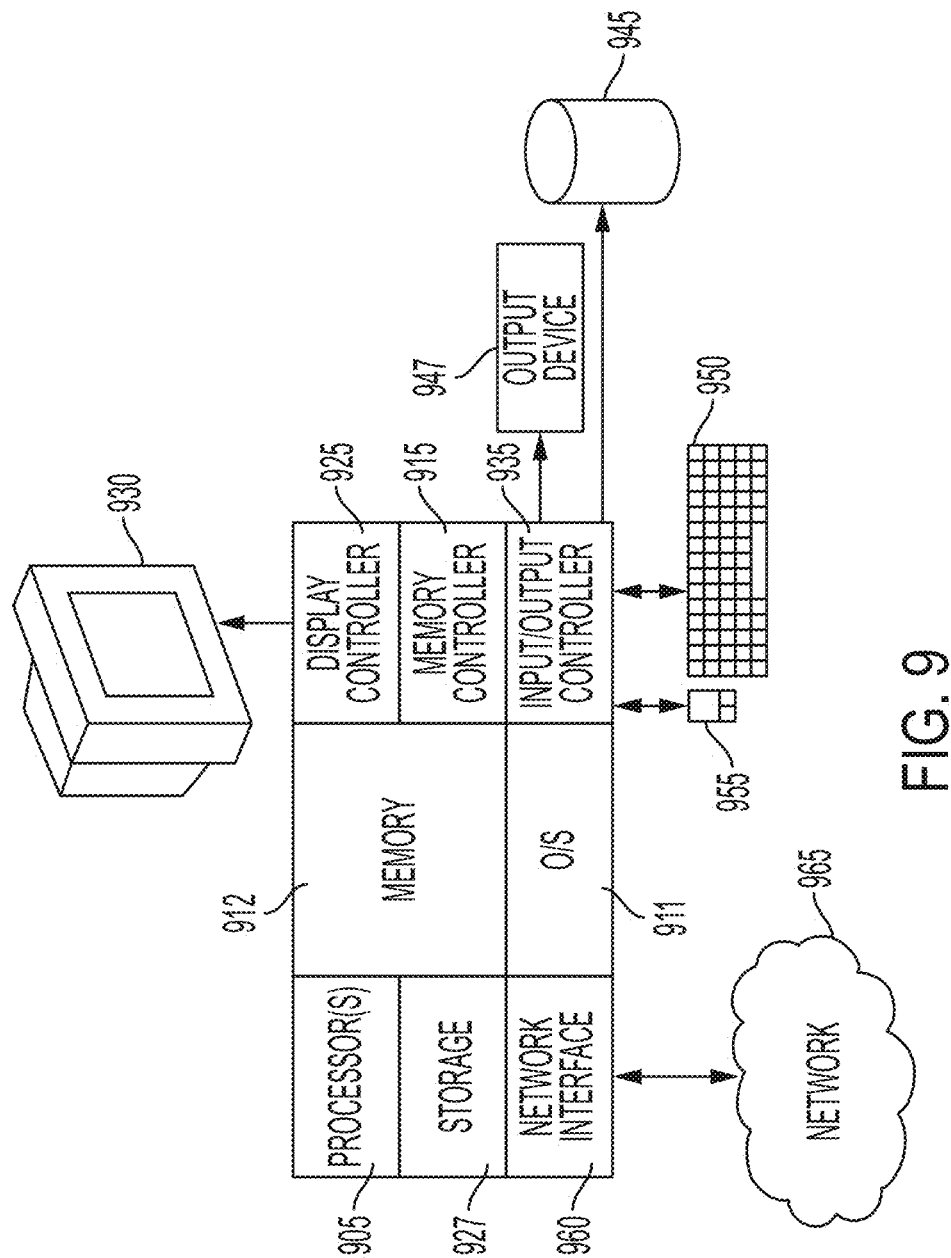

PROVIDING INSIGHTS ABOUT ATTENDEES OF SMART WEB-EVENTS

BACKGROUND

Embodiments of the present invention relate in general to using computer systems for electronic communication, and more specifically to providing insights about web conference attendees.

Many business organizations are using teleconferencing tools, such as web conferencing tools, to conduct business meetings. The participants, or attendees, of the meetings may work for the business organization, or they may be external to the business organization such as customers of the business organization or service providers to the business organization. During the meetings conducted using teleconferencing tools, the attendees often share content by sharing their screens in a virtual meeting room, where an attendee can see the name and sometimes a picture of other attendees which includes other people who have logged into the meeting. For a big meeting and/or an external meeting with people outside of the business organization, it can be difficult for an attendee to know the roles and responsibilities or backgrounds of the other attendees. The same issue can arise, for example during a kickoff meeting for a new project. For the participants in the conference call, it is often challenging to know what questions to ask or what information can be disclosed when they do not have information about the other participants in the call.

Accordingly, while computer systems for providing electronic communications are suitable for their intended purposes, what is needed are computer systems having certain features of embodiments of the present invention.

SUMMARY

Embodiments of the present invention include methods, systems, and computer program products for smart web-event attendee insights. A non-limiting example method includes retrieving, by a processor, a list of participants invited to a meeting, the list of participants including a first participant and a second participant. It is determined, by the processor, whether the first participant has previously interacted with the second participant. Output is provided, by the processor to a user interface of a user device. The output includes information about the second participant based at least in part on determining that the first participant has not previously interacted with the second participant. The output includes information about an interaction between the first participant and the second participant based at least in part on determining that the first participant has previously interacted with the second participant.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

FIG. 9 is a block diagram of a computer system for implementing some or all aspects of performing cognitive contact assistance with dynamically generated contact lists for messages according to one or more embodiments of the present invention.

Figure 1:
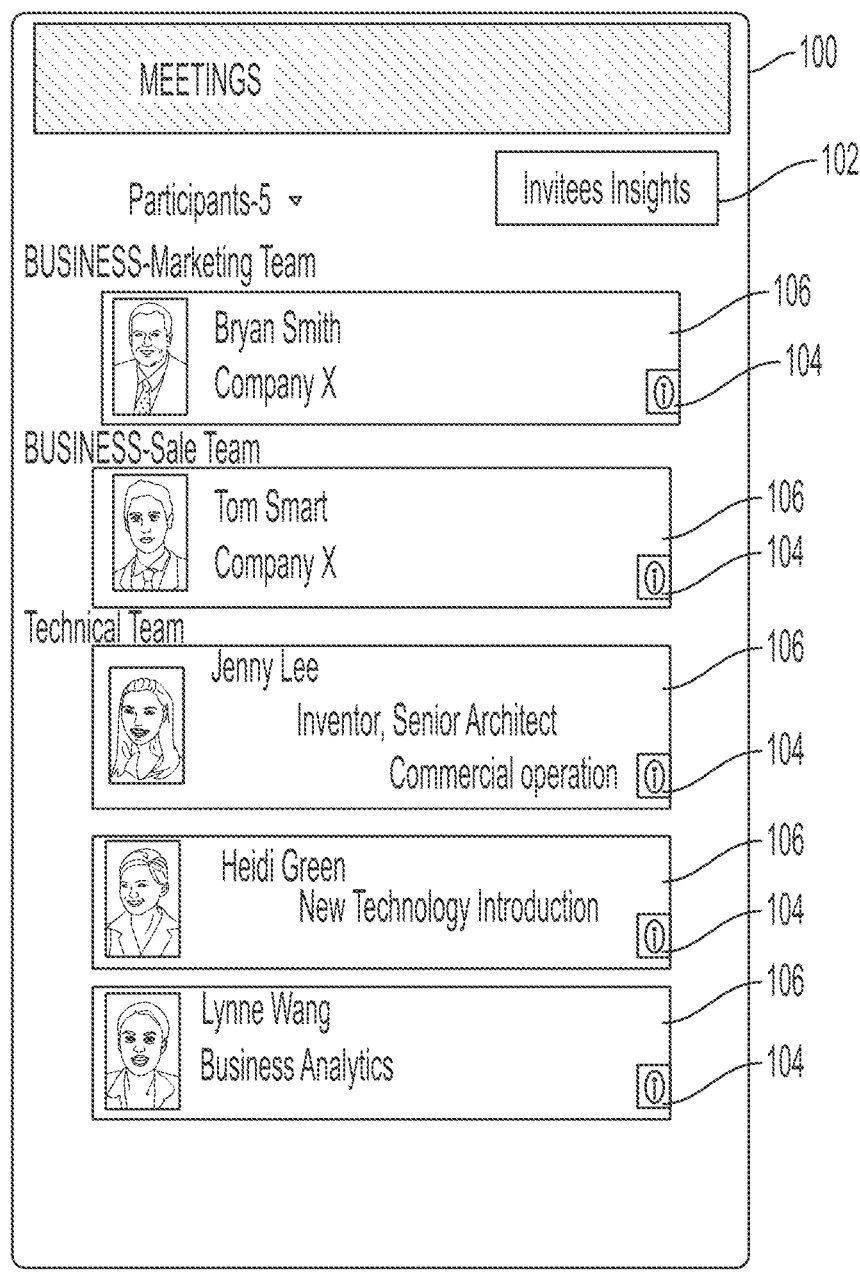
FIG. 1 depicts a user interface that displays a list of attendees of a meeting in accordance with one or more embodiments of the present invention.

The diagrams depicted herein are illustrative. There can be many variations to the diagram or the operations described therein without departing from the spirit of the invention. For instance, the actions can be performed in a differing order or actions can be added, deleted or modified. Also, the term "coupled" and variations thereof describes having a communications path between two elements and does not imply a direct connection between the elements with no intervening elements/connections between them. All of these variations are considered a part of the specification.

DETAILED DESCRIPTION

One or more embodiments of the present invention automatically generate information about attendees of a web conference in order to give an attendee insight into the background of other attendees and to provide reminders to the attendee about any prior interactions with the other attendees. This is contrasted with contemporary manners of getting information about other attendees of a web conference which can include an attendee manually copying the invitee distribution list, and then manually searching each individual's background. Basic information about a person such as organization, position, and phone number may be obtained from company directories. This manual approach to gathering information about invitees to a meeting can be cumbersome and may not result in getting relevant background information or information about previous interactions with the other invitees. In addition, all of the people invited might not attend the meeting and some of the manual search time and resources may be wasted.

In accordance with one or more embodiments of the present invention, methods and systems are provided to automatically detect if a meeting attendee has had any prior interactions with the rest of the participants, or attendees, of the meeting. Data describing any prior interactions can be displayed on a user interface, such as a display screen, of the meeting attendee. The information that is displayed can be different for each user. In addition, or alternatively, the system can provide background information about the other attendee to the user. One or more embodiments of the present invention perform different types of searches to locate the background information, based for example on the other attendee's name, email, and/or picture (which may be shown in the virtual meeting too). The searching may be performed in public information sources, such as social or business networks, and/or other locations on the world-wide web to build a comprehensive profile, or resume, of each individual who joins the virtual meeting as an attendee. Based at least in part on the information gathered about the meeting attendees, the meeting attendees may be sorted into different categories such as, but not limited to: software developer, marketing expert, and test specialist. The results of the searches may also include featured information such as, but not limited to: publications and speaking engagements.

One or more embodiments of the present invention provide a picture of a meeting attendee who does not have a picture shown in the web conference, or virtual meeting. The picture can be inserted into the display of the virtual meeting. The insertion of a meeting attendee's picture can be helpful to other meeting attendees who may recognize the picture of the meeting attendee but may not remember their name. In accordance with one or more embodiments of the present invention, the picture is a profile picture from another source such as LinkedIn or Facebook.

As used here, the term "web conference" or "audio/video conference" refers to a type of virtual meeting that allows one or multiple hosts to conduct a meeting, seminar, or conference with participants from different locations with sound and vision. The sounds and full-motion video images of the participants and hosts are transmitted in real time or near-real time to allow a live, visual connection among them. Examples of web conference tools include, but are not limited to Zoom, GoToMeeting, Webex, etc.

As used herein the term "meeting invitee" refers to a person who is invited to a meeting or web conference. As used herein, the term "meeting attendee" or "meeting participant" refers to a person who is participating in a meeting.

Cognitive computing, or cognitive analytics, refers to leveraging information technology (IT) to improve a user's understanding of the world, and as a result of the improved understanding the user may make more informed or better decisions. One or more embodiments of the present invention leverage the concept of cognitive technology to provide insights into the attendees and to provide a personalized view of each of the attendees, including key interactions that this attendee has had with others who are also attending the meeting.

One or more embodiments of the present invention provide a technological improvement over current electronic communication systems that do not automatically detect if a meeting attendee has interacted with or met other meeting attendees of a web conference or audio/video conference. Contemporary approaches rely on each meeting attendee remembering or manually searching (e.g., reviewing emails) for information about previous interactions with another meeting attendee or invitee. Disadvantages of contemporary methods of relying on each meeting attendee to remember or to find information about prior interactions include not being informed about prior interactions and the amount of manual effort that is required by each individual invited to the meeting. One or more embodiments of the present invention search through information sources such as email records, text messages, meeting records, live chats records and telephone records to identify previous interactions, or electronic communications, between the meeting participants. This can lead to a decrease in the use of processor, network, and human resources when compared to contemporary methods. One or more embodiments of the present invention can also perform the searching automatically during a meeting when requested by a user which can lead to the most up to date information about previous interactions and a savings in resources by not searching for interactions between all of the meeting attendees.

One or more embodiments of the present invention provide a technological improvement over current electronic communication systems that do not automatically provide background introductory and/or summary information about other attendees in a meeting. Contemporary approaches rely on each meeting attendee to lookup information about other meeting attendees or invitees that they may not have previously interacted with. Disadvantages of contemporary methods of relying on each meeting attendee to find background information about other meeting attendees is the amount of manual effort that is required by each individual invited to the meeting. One or more embodiments of the present invention search through publicly available sources to gather information about a meeting invitee or attendee. This can lead to a decrease in the use of processor, network, and human resources when compared to contemporary methods. One or more embodiments of the present invention can also perform the searching automatically during a meeting when requested by a user which can lead to retrieving the most up to date information about a person as well as a savings in resources by not searching for background information about all of the meeting attendees.

Turning now to FIG. 1, a user interface 100 that displays a list of attendees of a meeting is generally shown in accordance with one or more embodiments of the present invention. The user interface 100 shown in FIG. 1 can be a display screen located on a user device such as, but not limited to a mobile telephone or a laptop computer. The user interface 100 shown in FIG. 1 includes a user interface output by a web conference tool with a link 102 to an invitees insights module to perform all or a subset of the processing described herein. The user interface 100 includes a list of meeting attendee identifiers 106 sorted based on the attendees' roles in the meeting (e.g., Business-Marketing Team). Each of the meeting attendee identifiers 106 includes a name of the meeting attendee, a picture of the meeting attendee, a company and/or title of the meeting attendee, and an information selection box 104. An information selection box 104 may be selected by a user to obtain addition information about the corresponding meeting attendee. The user interface 100 shown in FIG. 1 can be displayed to any of the meeting attendees via the web conference and is not customized on a particular one of the meeting attendees.

The sorting of meeting attendee identifiers 106 by role in the user interface 100 shown in FIG. 1 is performed by one or more embodiments of the present invention. Other sorting orders can also be implemented such as, but not limited to alphabetic or by company. For user interfaces that have been customized for viewing by a particular meeting attendee, sorting orders such as, but not limited to, a number of interactions detected between the particular meeting attendee and other meeting attendees can be implemented by one or more embodiments of the present invention.

Figure 2:
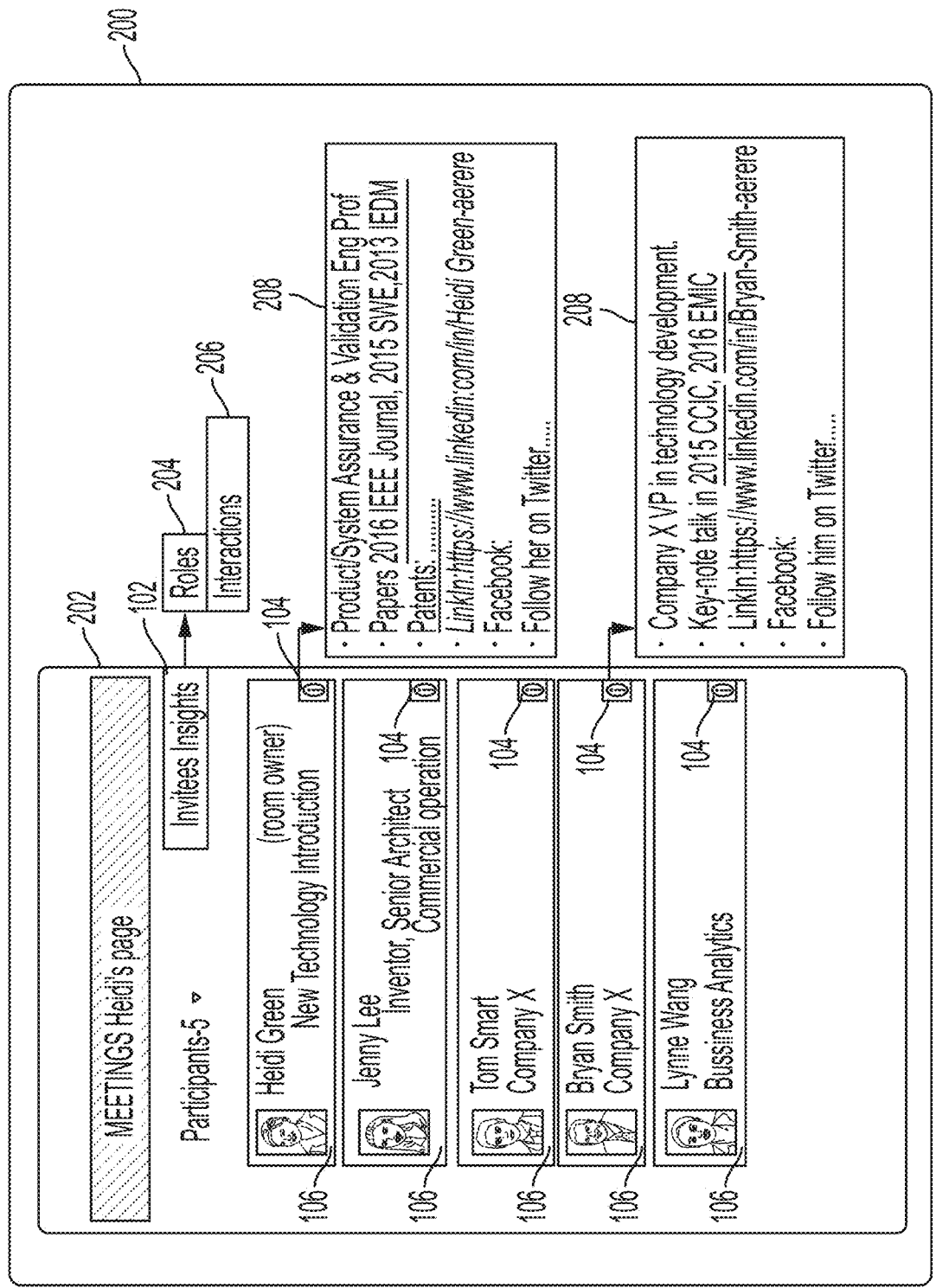
FIG. 2 depicts a user interface that displays a list of meeting attendees as well as background information about selected attendees in accordance with one or more embodiments of the present invention.

Turning now to FIG. 2, a user interface 200 that displays a list of meeting attendees as well as background information about selected attendees is generally shown in accordance with one or more embodiments of the present invention. The user interface 200 shown in FIG. 2 can be a display screen located on a user device such as, but not limited to a mobile telephone or a laptop computer. The user interface 200 shown in FIG. 2 includes a view 202 of the meeting attendees that has been customized for a meeting attendee named "Heidi." As shown in FIG. 2, the first meeting attendee identifier 106 is for the meeting attendee named "Heidi", the meeting attendee that the view 202 has been customized for. As shown in FIG. 2, the link 102 to the invitees insights module has been selected and two options are displayed in the user interface 200 of FIG. 2: a roles option 204 and an interactions option 206. As shown in FIG. 2, the roles option 204 is selected which causes information 208 about a meeting attendee to be display on the user interface 200 when a corresponding information selection box 104 is selected. As shown in FIG. 2, information 208 about the meeting attendees named Heidi and Bryan are displayed in the user interface 200.

Figure 3:
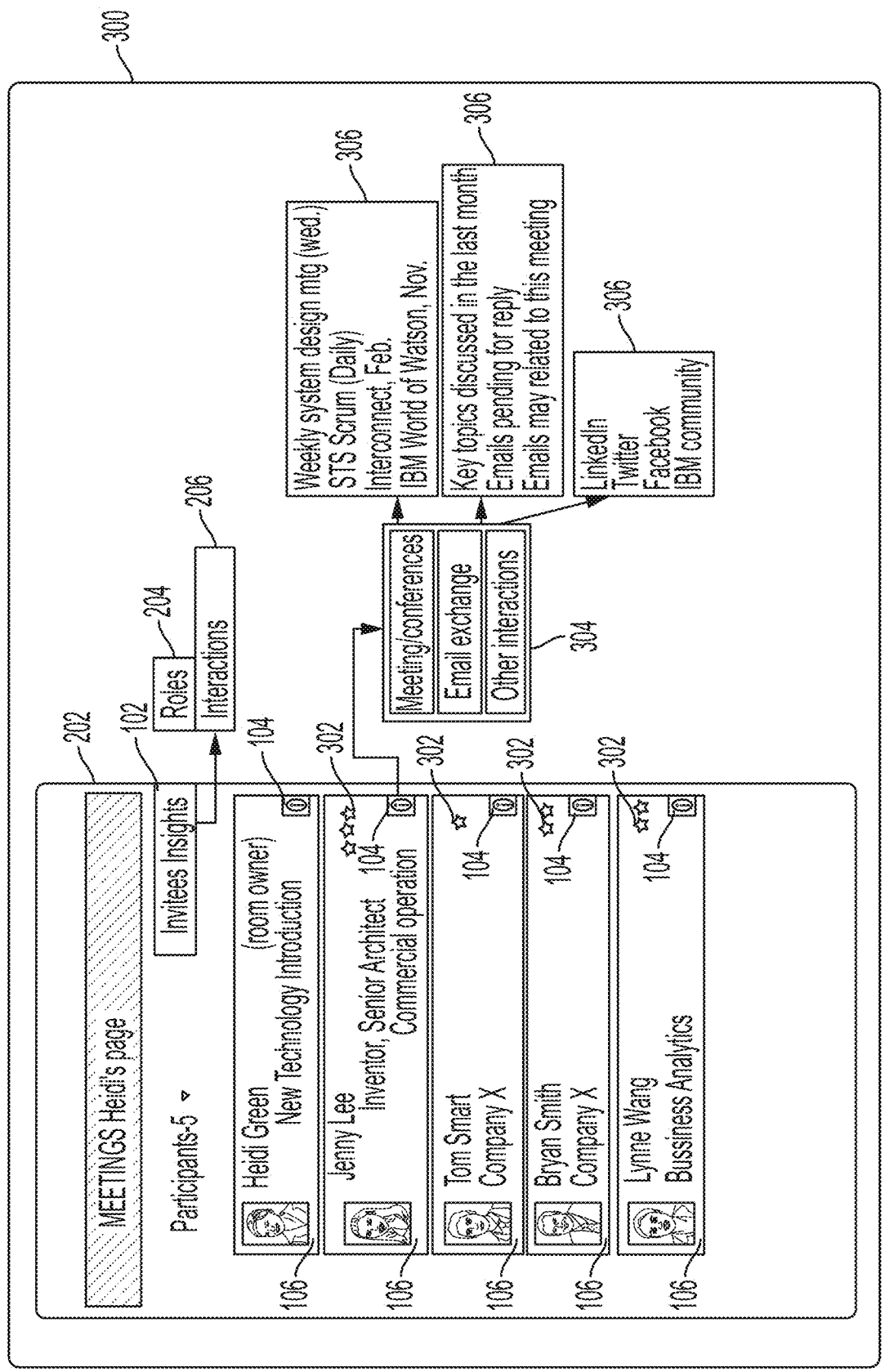
FIG. 3 depicts a user interface that displays a list of meeting attendees as well as interaction information in accordance with one or more embodiments of the present invention.

Turning now to FIG. 3, a user interface 300 that displays a list of meeting attendees as well as interaction information is generally shown in accordance with one or more embodiments of the present invention. The user interface 300 shown in FIG. 3 can be a display screen located on a user device such as, but not limited to a mobile telephone or a laptop computer. The user interface 300 shown in FIG. 3 includes the view 202 of the meeting attendees that has been customized for the meeting attendee named "Heidi." As shown in FIG. 3, the link 102 to the invitees insights module has been selected and two options are displayed in the user interface 200 of FIG. 2: a roles option 204 and an interactions option 206. As shown in FIG. 3, the interactions option 206 is selected which causes information 304 about interactions between the meeting attendee who the view 202 is customized for ("Heidi") and other selected meeting attendees.

As shown in FIG. 3, a visual indicator 302 is used to indicate how much interaction has occurred between them. The visual indicator 302 shown in FIG. 3 is a number of stars, with more stars indicating more interactions between the meeting attendee and the other meeting attendee. As shown in FIG. 3, "Heidi" has had the most interactions with the meeting attendee named "Jenny" as indicated by the three stars in the visual indicator 302 and the fewest interactions with the meeting attendee named "Tom" as indicated by the one star. In an embodiment, a visual indicator 302 of no stars can be used to indicate that no previous interactions were located. In accordance with one or more embodiments of the present invention, the visual indicator 302 can be color coded to show, for example, whether the corresponding meeting attendee works for the same company or the same department as the meeting attendee that the view 202 is customized for. In accordance with one or more embodiments of the present invention, the meeting attendee identifiers can be sorted based on a number of interactions as reflected by the visual indicator 302.

As shown in FIG. 3, the information selection box 104 associated with the meeting attendee named "Jenny" has been selected and information 304 about interactions between "Heidi" and "Jenny" are displayed on the user interface 300. As shown in FIG. 3, the information 304 includes information about meetings/conferences, email exchanges, and other interactions. Interaction details 306 corresponding to each of these categories are shown in the user interface 300 of FIG. 3.

In accordance with one or more embodiments of the present invention a different view can be created for each of the meeting attendees and interaction information will likely differ between each of the views. User interface 200 and user interface 300 depict a view 202 customized for the meeting attendee names "Heidi."

Figure 4:
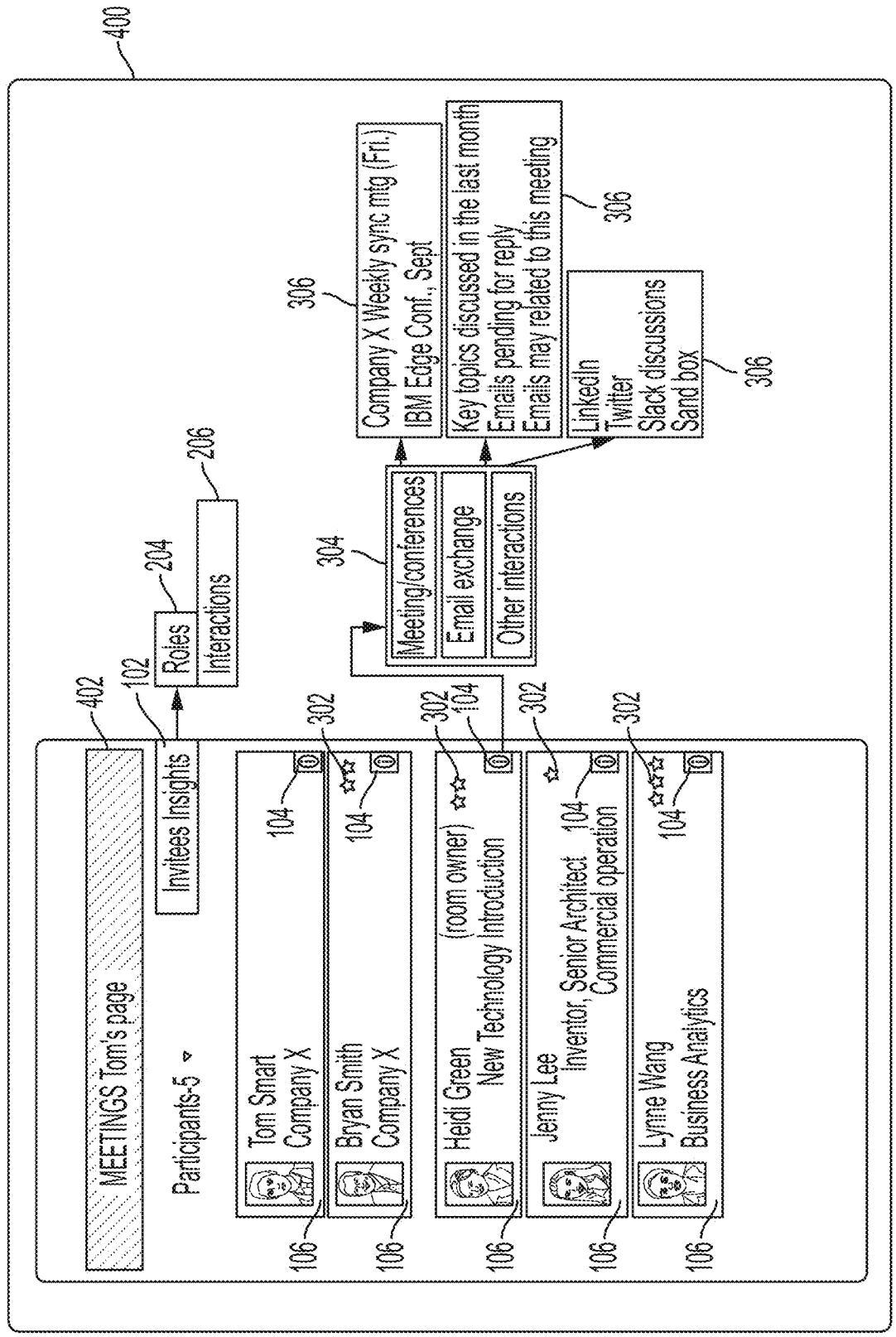
FIG. 4 depicts a user interface that displays a list of meeting attendees as well as interaction information in accordance with one or more embodiments of the present invention.

Turning now to FIG. 4, a user interface 400 that depicts a view 402 customized for the meeting attendee named "Tom" is generally shown in accordance with one or more embodiments of the present invention. The user interface 400 shown in FIG. 4 can be a display screen located on a user device such as, but not limited to a mobile telephone or a laptop computer. As shown in FIG. 4, the link 102 to the invitees insights module has been selected and two options are displayed in the user interface 200 of FIG. 2: a roles option 204 and an interactions option 206. As shown in FIG. 4, the interactions option 206 is selected which causes information 304 about interactions between the meeting attendee who the view 402 is customized for ("Tom") and other selected meeting attendees.

As shown in FIG. 4, a visual indicator 302 is used to indicate how much interaction has occurred between them. As shown in FIG. 4, "Tom" has had the most interactions with the meeting attendee named "Lynne" as indicated by the three stars in the visual indicator 302 and the fewest interactions with the meeting attendee named "Jenny" as indicated by the one star. As shown in FIG. 4, the information selection box 104 associated with the meeting attendee named "Heidi" has been selected and information 304 about interactions between "Tom" and "Heidi" are displayed on the user interface 400. As shown in FIG. 4, the information 304 includes information about meetings/conferences, email exchanges, and other interactions. Interaction details 306 corresponding to each of these categories are shown in the user interface 400 of FIG. 4.

Figure 5:
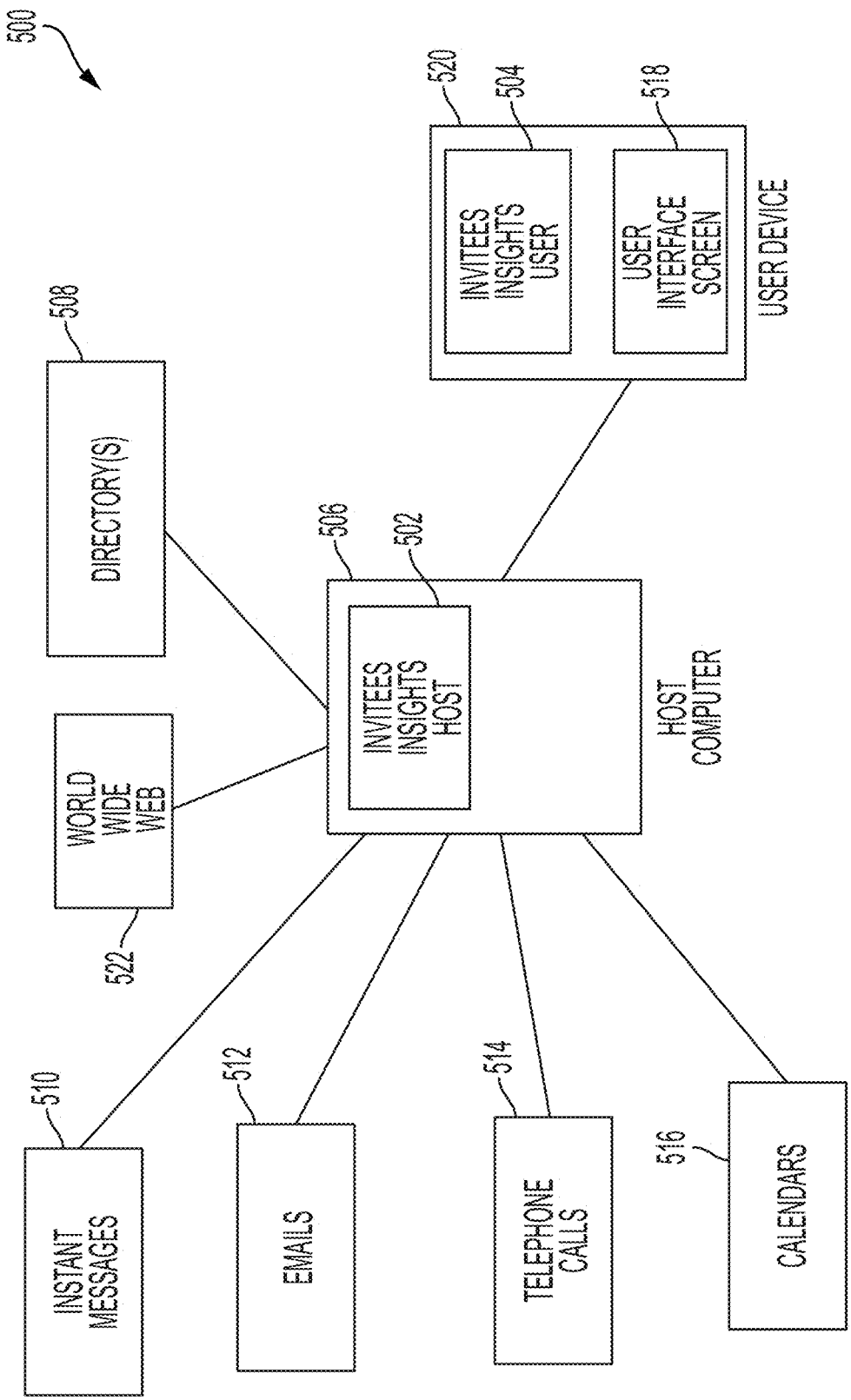
FIG. 5 depicts a system for providing information about web conference attendees in accordance with one or more embodiments of the present invention.

Turning now to FIG. 5, a system 500 for providing information about web conference attendees is generally shown in accordance with one or more embodiments of the present invention. As shown in FIG. 5, a user device 520 executing an invitees insights user module 504 is in communication (e.g., via a network) with a host computer 506 executing an invitees insights host module 502. The user device 520 shown in FIG. 5 also includes a user interface screen 518 which may be utilized to display the user interfaces of FIGS. 1-4.

In accordance with one or more embodiments of the present invention, the user device 520 does not execute invitees insights user module 504 and instead accesses the invitees insights host module 502 executing on the host computer 506 to perform the processing described herein. In accordance with one or more embodiments of the present invention, the user device 520 executes the invitees insights user module 504 to perform all of the processing described herein. In accordance with one or more embodiments of the present invention, the processing described herein is performed by a combination of the invitees insight host module 502 executing on the host computer 506 and the invitees insight user module executing on the user device 520.

The user device 520 shown in FIG. 5 can be implemented by any computer device known in the art such as, but not limited to: a mobile device; a laptop computer; a desktop computer; a monitor; a smartphone; a tablet computer; and a smart television. In accordance with one or more embodiments of the present invention, the user device 520 is implemented by one of the computing devices 54A-N of FIG. 7 below and the host computer 506 is implemented by a cloud computing node 10 of FIG. 7 below.

Also shown in FIG. 5 are sources of data that can be utilized by one or more embodiments of the present invention to generate background and/or interaction information for display during a web conference. The information sources shown in FIG. 5 include instant messages database 510, emails database 512, telephone call database 514, calendar database 516, the world-wide web 522 and directory databases 508. One or more of these information sources can be coupled to the host computer 506 via one or more networks. One or more embodiments of the present invention gather information about previous interactions with other meeting attendees by searching through the information sources using names, emails, telephone phone numbers, nicknames, identifications, photos, and/or images of the other meeting attendees.

The instant messages database 510 can include previously sent instant messages between different users, including the meeting invitees. Similarly, the emails database 512 can include email messages previously sent between different users, the telephone call database 514 can include a record of telephone calls between different users, and the calendars database 516 can include data about meetings that took place and attendees. In addition, the directory database 508 can include information about corporate organizations, titles, and contact information for employees.

In accordance with one or more embodiments of the present invention, a user can specify the information sources that can be used to gather background information and/or interaction information for the user. This can be an option in a setup process performed by the invitees insights user module 504.

In accordance with one or more embodiments of the present invention, data from the information sources can be searched to obtain information about interactions between meeting attendees. For example, John and Mary are both meeting attendees, and John did not seem to remember Mary even though he has worked with Mary on a project many years ago. The system can search the interactions, or electronic communications, between John and Mary from identified sources including emails, calendar invites, contact list, text messages, chats, etc. In this example, the system finds several email exchanges between John and Mary and other members of a supply chain customer project five years ago. The system will remind John that Mary was the project manager of a supply chain project that they worked on together five years ago. In another example, John and Mary can be also connected in a social networking group on Facebook. The system can search John's friend list on Facebook or other social networks and groups that he belongs to. The system can discover that John and Mary are both members of an Italian Cooking Group on Facebook. The system will share this insight with John. Likewise, the system can look up John's information for Mary.

In another example, Peter is also participating in the same web conference with John, and John has never met Peter. However, the system has looked up John's calendar tool and discovers that John has attended a webinar about ecommerce, and that Peter was the speaker. The system can provide this information to John. In another example, Robert is also attending the same web conference with John; and Robert and John have never met. The system can search all of the data sources and confirms that they have not interacted with each other. However, the system may discover that John likes fishing as he has posted pictures of his fishing trip, and the system may also discover that Robert likes fishing. The system can confirm to John that he and Robert has not met before but that both share the same interest, or hobby, which is fishing. Over time, the system can learn about the people that John has interactions with and develop a personal interaction profile for John. For example, the system has discovered that John has interacted with a number of employees from a business partner, company ABC. In the future, when an employee of company ABC, named Tim for example, attends the same meeting with John, the system can quickly draws the relationship that John has worked with many employees of company ABC even though John has not worked with Tim yet.

Figure 6:
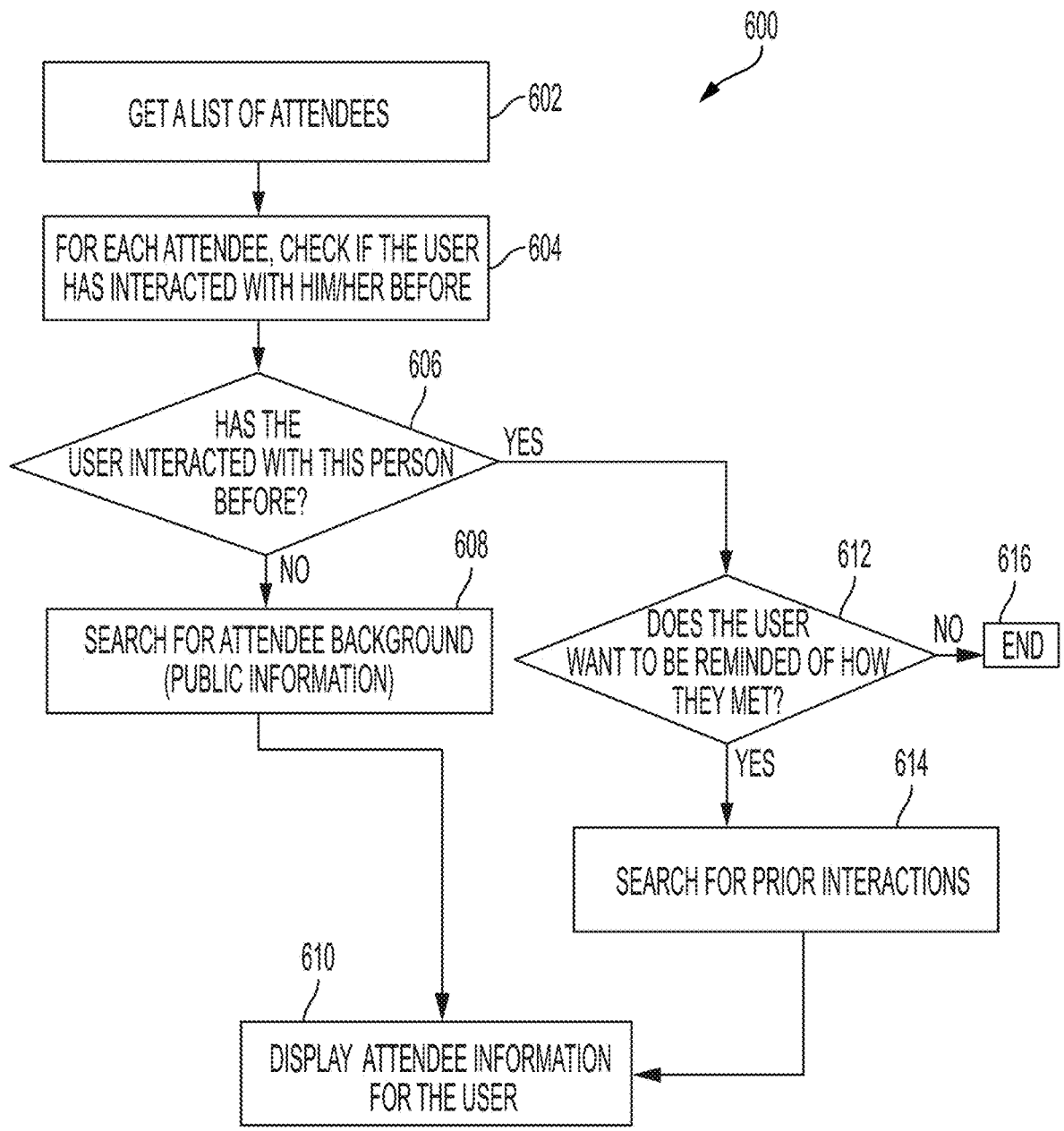
FIG. 6 is a flow diagram of a process for providing information about web conference attendees in accordance with one or more embodiments of the present invention.

Turning now to FIG. 6, a flow diagram 600 of a process for providing information about web conference participants is generally shown in accordance with one or more embodiments of the present invention. The processing shown in FIG. 6 can be implemented for a meeting participant by one or both of the invitees insights host module 502 executing on the host computer 506 and the invitees insights user module 504 executing on the user device 520. At block 602, a list of other meeting participants, or attendees, is received. Blocks 604-616 are performed for at least a subset of the other meeting attendees on the list. At block 604 it is determined whether the meeting attendee, or user, has interacted with the other meeting attendee in the past. This can be determined by asking the user and/or by performing a quick search to find at least one interaction between them. If it is determined at block 606, that the user has interacted with the meeting attendee in the past, then processing continues at block 612 with determining whether the use would like to be reminded of how they met. If the user does not want to be reminded, then processing ends at block 616, otherwise processing continues at block 614 with searching for prior interactions between the user and the other meeting attendee. Information about the prior interactions is displayed to the user via a user interface at block 610.

If it is determined at block 606 of FIG. 6, that the user has not interacted with the meeting attendee in the past, then processing continues at block 608 with searching public information sources (e.g., the world-wide web) for background information about the other attendee. The background information about the other attendee is displayed to the user via a user interface at block 610.

In accordance with one or more embodiments of the present invention, the information is not displayed without receiving a prompt from the user requesting the display of information.

In accordance with one or more embodiments of the present invention, background information is obtained for the other meeting attendee along with information about interactions. Thus, referring back to FIG. 6, blocks 612-616 are performed after block 610.

In accordance with one or more embodiments of the present invention, the process shown in FIG. 6 is performed while the meeting is in process. The process shown in FIG. 6 can also be performed in advance of the meeting time for the list of invitees to the meeting for example, in response to a meeting participant accepting a meeting invitation. This information gathered ahead of time can be updated once the meeting starts if requested. In this manner, computer cycles can be used at non-peak times to find background information and interaction information that has a low likelihood of changing before the meeting occurs. The process shown in FIG. 6 can also be performed in advance of the meeting time in response to a meeting invitee accepting the meeting invitation, which can be broadcast to other meeting invitees who have accepted the invitation. In accordance with one or more embodiments, the background information for a meeting participant is gathered once and shared among the meeting participants. In accordance with one or more embodiments, the process shown in FIG. 6 is performed ahead of time for people who have accepted the meeting invitation and performed during the meeting for meeting attendees not on the invitation list or who did not accept the meeting invitation.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics Are As Follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
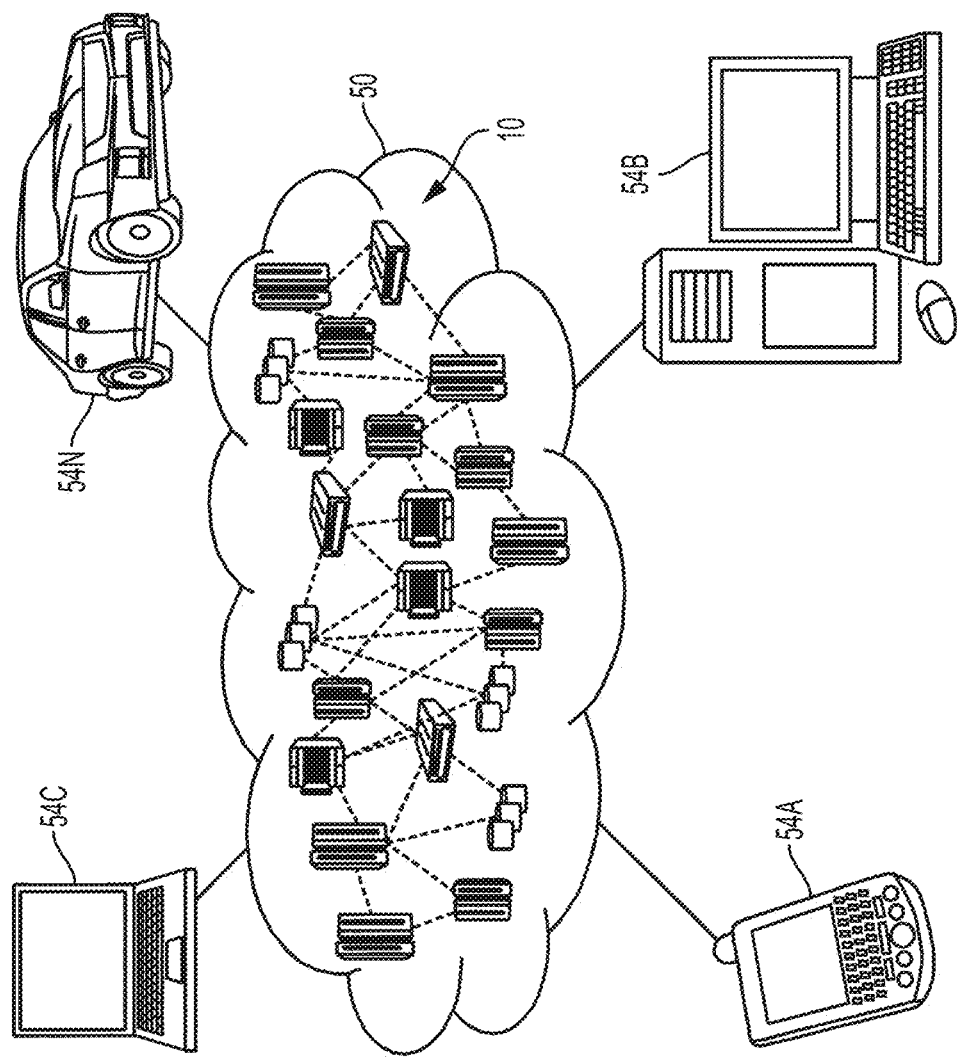
FIG. 7 depicts a cloud computing environment according to one or more embodiments of the present invention.

Referring now to FIG. 7, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 7 are intended to be illustrative only and that computing nodes 10 and cloud computing environment 50 can communicate with any type of computerized device over any type of network and/or network addressable connection (e.g., using a web browser).

Figure 8:
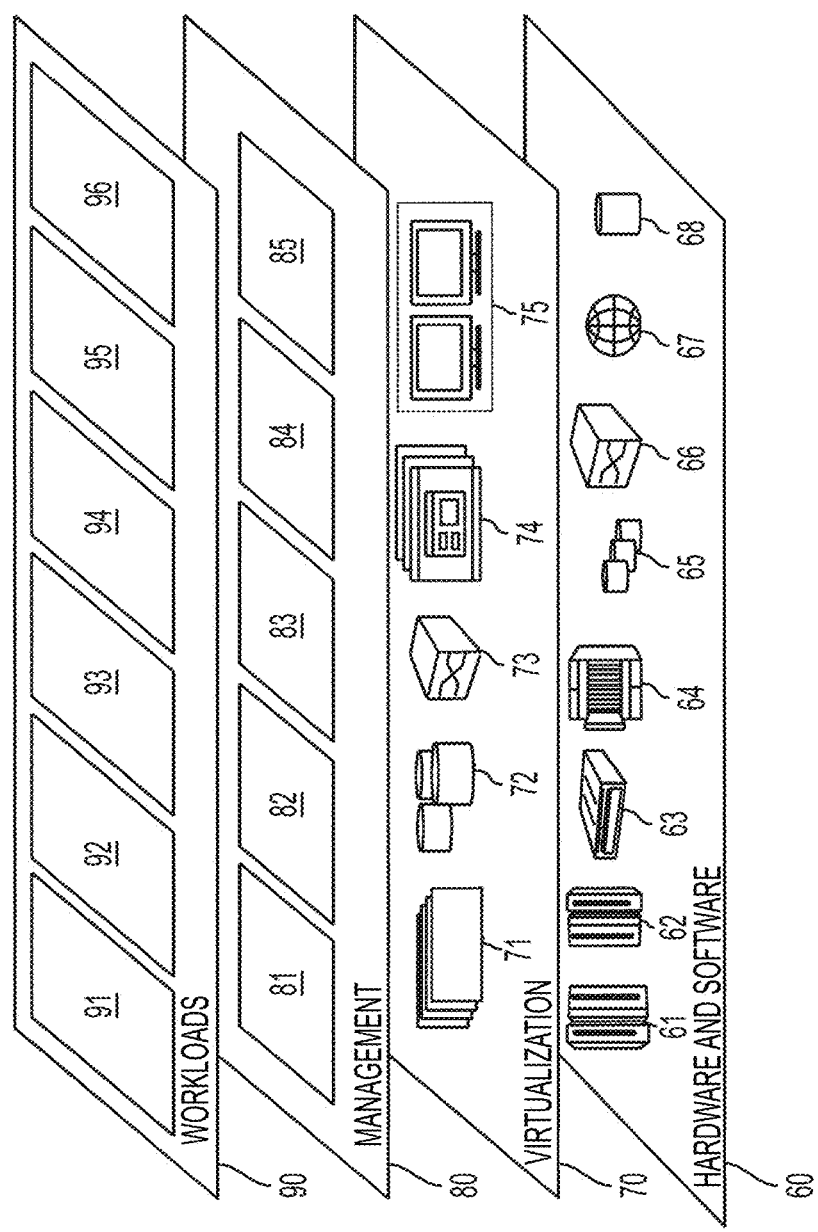
FIG. 8 depicts abstraction model layers according to one or more embodiments of the present invention.

Referring now to FIG. 8, a set of functional abstraction layers provided by cloud computing environment 50 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and mobile desktop 96.

In accordance with one or more embodiments of the present invention, the system 500 shown in FIG. 5 is located in the cloud computing environment of FIG. 8 where all or a subset of the processing shown in FIGS. 1-6 is performed.

Turning now to FIG. 9, a block diagram of a computer system for implementing some or all aspects of performing providing insight about web conference attendees is generally shown in accordance with one or more embodiments of the present invention. The processing described herein may be implemented in hardware, software (e.g., firmware), or a combination thereof. In an exemplary embodiment, the methods described may be implemented, at least in part, in hardware and may be part of the microprocessor of a special or general-purpose computer system, such as a mobile device, personal computer, workstation, minicomputer, or mainframe computer. In an embodiment one or both of the host computer 506 and the user device 520 are implemented by the computer system shown in FIG. 9.

In an exemplary embodiment, as shown in FIG. 9, the computer system includes a processor 905, memory 912 coupled to a memory controller 915, and one or more input devices 945 and/or output devices 947, such as peripherals, that are communicatively coupled via a local I/O controller 935. These devices 947 and 945 may include, for example, a printer, a scanner, a microphone, and the like. A conventional keyboard 950 and mouse 955 may be coupled to the I/O controller 935. The I/O controller 935 may be, for example, one or more buses or other wired or wireless connections, as are known in the art. The I/O controller 935 may have additional elements, which are omitted for simplicity, such as controllers, buffers (caches), drivers, repeaters, and receivers, to enable communications.

The I/O devices 947, 945 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 905 is a hardware device for executing hardware instructions or software, particularly those stored in memory 912. The processor 905 may be a custom made or commercially available processor, a central processing unit (CPU), an auxiliary processor among several processors associated with the computer system, a semiconductor based microprocessor (in the form of a microchip or chip set), a microprocessor, or other device for executing instructions. The processor 905 can include a cache such as, but not limited to, an instruction cache to speed up executable instruction fetch, a data cache to speed up data fetch and store, and a translation look-aside buffer (TLB) used to speed up virtual-to-physical address translation for both executable instructions and data. The cache may be organized as a hierarchy of more cache levels (L1, L2, etc.).

The memory 912 may include one or combinations of volatile memory elements (e.g., random access memory, RAM, such as DRAM, SRAM, SDRAM, etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 912 may incorporate electronic, magnetic, optical, or other types of storage media. Note that the memory 912 may have a distributed architecture, where various components are situated remote from one another but may be accessed by the processor 905.

The instructions in memory 912 may include one or more separate programs, each of which comprises an ordered listing of executable instructions for implementing logical functions. In the example of FIG. 9, the instructions in the memory 912 include a suitable operating system (OS) 911. The operating system 911 essentially may control the execution of other computer programs and provides scheduling, input-output control, file and data management, memory management, and communication control and related services.

Additional data, including, for example, instructions for the processor 905 or other retrievable information, may be stored in storage 927, which may be a storage device such as a hard disk drive or solid state drive. The stored instructions in memory 912 or in storage 927 may include those enabling the processor to execute one or more aspects of the dispatch systems and methods of this disclosure.

The computer system may further include a display controller 925 coupled to a display 930. In an exemplary embodiment, the computer system may further include a network interface 960 for coupling to a network 965. The network 965 may be an IP-based network for communication between the computer system and an external server, client and the like via a broadband connection. The network 965 transmits and receives data between the computer system and external systems. In an exemplary embodiment, the network 965 may be a managed IP network administered by a service provider. The network 965 may be implemented in a wireless fashion, e.g., using wireless protocols and technologies, such as WiFi, WiMax, etc. The network 965 may also be a packet-switched network such as a local area network, wide area network, metropolitan area network, the Internet, or other similar type of network environment. The network 965 may be a fixed wireless network, a wireless local area network (LAN), a wireless wide area network (WAN) a personal area network (PAN), a virtual private network (VPN), intranet or other suitable network system and may include equipment for receiving and transmitting signals.

Systems and methods for providing insights about web conference attendees can be embodied, in whole or in part, in computer program products or in computer systems, such as that illustrated in FIG. 9.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" may be understood to include any integer number greater than or equal to one, i.e. one, two, three, four, etc. The terms "a plurality" may be understood to include any integer number greater than or equal to two, i.e. two, three, four, five, etc. The term "connection" may include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
    receiving, by a processor, a list of participants invited to a meeting, the list of participants including a first participant and a second participant;
    determining, automatically by the processor in response to receiving the list, whether the first participant has previously interacted with the second participant, the determining comprising searching information sources that include electronic communication records and meeting records;
    based on determining that the first participant has not previously interacted with the second participant:
        retrieving, automatically by the processor, background information about the second participant from public information sources including the world-wide-web; and
        presenting, in response to the first participant logging into the meeting, the retrieved information about the second participant to the first participant via a user interface of a user device, the user interface including the list of participants in a first order and an indication that the retrieved information about the second participant is associated with the second participant;
    based on determining that the first participant has previously interacted with the second participant:
        retrieving, automatically by the processor, information about an interaction between the first participant and the second participant; and
        presenting, in response to the first participant logging into the meeting, the information about the interaction to the first participant via the user interface of the user device, the user interface including the list of participants in the first order and an indication that the retrieved information about an interaction between the first participant and the second participant is associated with the second participant; and
    obtaining, automatically by the processor and while the first participant is logged into the meeting, additional information about the second participant, and based at least in part on the additional information updating the user interface presented to the user to include the list of participants in a second order different than the first order,
    wherein the meeting is a web conference.

2. The method of claim 1, wherein at least a subset of the determining is performed during the web conference.

3. The method of claim 1, wherein the determining further comprises searching for an electronic communication between the first participant and the second participant.

4. The method of claim 1, wherein the determining further comprises searching for another meeting that was attended by both the first participant and the second participant.

5. The method of claim 1, wherein the background information about the second participant comprises a picture of the second participant.

6. The method of claim 1, wherein the information about an interaction between the first participant and the second participant includes one or both of a date of the interaction and a description of the interaction including roles of the first participant and the second participant in the interaction.

7. The method of claim 1, wherein the user interface is a display device.

8. A system comprising:
a memory having computer readable instructions; and
one or more processors for executing the computer readable instructions, the computer readable instructions controlling the one or more processors to perform operations comprising:
receiving, by a processor, a list of participants invited to a meeting, the list of participants including a first participant and a second participant, the determining comprising searching information sources that include electronic communication records and meeting records;
determining, automatically by the processor in response to receiving the list, whether the first participant has previously interacted with the second participant;
based on determining that the first participant has not previously interacted with the second participant:
retrieving, automatically by the processor, background information about the second participant from public information sources including the world-wide-web; and
presenting, in response to the first participant logging into the meeting, the retrieved information about the second participant to the first participant via a user interface of a user device, the user interface including the list of participants in a first order and an indication that the retrieved information about the second participant is associated with the second participant;
based on determining that the first participant has previously interacted with the second participant:
retrieving, automatically by the processor, information about an interaction between the first participant and the second participant; and
presenting, in response to the first participant logging into the meeting, the information about the interaction to the first participant via the user interface of the user device, the user interface including the list of participants in the first order and an indication that the retrieved information about an interaction between the first participant and the second participant is associated with the second participant;
and
obtaining, automatically by the processor and while the first participant is logged into the meeting, additional information about the second participant and based at least in part on the additional information updating the user interface presented to the user to include the list of participants in a second order different than the first order,
wherein the meeting is a web conference.

9. The system of claim 8, wherein at least a subset of the determining is performed during the web conference.

10. The system of claim 8, wherein the determining comprises searching for an electronic communication between the first participant and the second participant.

11. The system of claim 8, wherein the determining further comprises searching for another meeting that was attended by both the first participant and the second participant.

12. The system of claim 8, wherein the background information about the second participant comprises a picture of the second participant.

13. The system of claim 8, wherein the information about an interaction between the first participant and the second participant includes one or both of a date of the interaction and a description of the interaction including roles of the first participant and the second participant in the interaction.

14. A computer program product comprising a computer readable storage medium having program instructions embodied therewith, the program instructions executable by a processor to cause the processor to perform operations comprising:
receiving, by a processor, a list of participants invited to a meeting, the list of participants including a first participant and a second participant;
determining, automatically by the processor in response to receiving the list, whether the first participant has previously interacted with the second participant, the determining comprising searching information sources that include electronic communication records and meeting records;
based on determining that the first participant has not previously interacted with the second participant:
retrieving, automatically by the processor, background information about the second participant from public information sources including the world-wide-web; and
presenting, in response to the first participant logging into the meeting, the retrieved information about the second participant to the first participant via a user interface of a user device, the user interface including the list of participants in a first order and an indication that the retrieved information about the second participant is associated with the second participant;
based on determining that the first participant has previously interacted with the second participant:
retrieving, automatically by the processor, information about an interaction between the first participant and the second participant; and
presenting, in response to the first participant logging into the meeting, the information about the interaction to the first participant via the user interface of the user device, the user interface including the list of participants in the first order and an indication that the retrieved information about an interaction between the first participant and the second participant is associated with the second participant;
and
obtaining, automatically by the processor and while the first participant is logged into the meeting, additional information about the second participant and based at least in part on the additional information updating the user interface presented to the user to include the list of participants in a second order different than the first order,
wherein the meeting is a web conference.

15. The computer program product of claim 14, wherein at least a subset of the determining is performed during the web conference.

16. The computer program product of claim 14, wherein the determining further comprises one or both of:
   searching for an electronic communication between the first participant and the second participant, and
   searching for another meeting that was attended by both the first participant and the second participant.

* * * * *